US008555057B2

(12) United States Patent
Raftelis et al.

(10) Patent No.: US 8,555,057 B2
(45) Date of Patent: Oct. 8, 2013

(54) SYSTEM AND METHOD FOR SECURING A NETWORK

(75) Inventors: Michael Raftelis, San Antonio, TX (US); Jae-Sun Chin, Helotes, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1543 days.

(21) Appl. No.: 11/490,848

(22) Filed: Jul. 21, 2006

(65) Prior Publication Data

US 2008/0022084 A1    Jan. 24, 2008

(51) Int. Cl.
*H04L 29/06* (2006.01)

(52) U.S. Cl.
USPC .......... 713/161; 726/150; 726/153; 726/168; 726/171; 726/181

(58) Field of Classification Search
USPC .......................................................... 713/161
See application file for complete search history.

(56) References Cited

U.S. PATENT DOCUMENTS

| | | | |
|---|---|---|---|
| 5,650,994 A * | 7/1997 | Daley ............................ | 370/259 |
| 6,055,236 A * | 4/2000 | Nessett et al. ................. | 370/389 |
| 6,353,891 B1 * | 3/2002 | Borella et al. ................. | 726/12 |
| 6,996,712 B1 * | 2/2006 | Perlman et al. ............... | 713/161 |
| 2001/0051996 A1 * | 12/2001 | Cooper et al. ................ | 709/217 |
| 2002/0019984 A1 * | 2/2002 | Rakib ............................ | 725/111 |
| 2002/0116615 A1 * | 8/2002 | Nguyen et al. ................ | 713/168 |
| 2002/0146125 A1 * | 10/2002 | Eskicioglu et al. ........... | 380/255 |
| 2003/0014521 A1 * | 1/2003 | Elson et al. ................... | 709/225 |
| 2003/0061568 A1 * | 3/2003 | Dijkstra ........................ | 715/513 |
| 2003/0185397 A1 * | 10/2003 | Ishiguro ........................ | 380/277 |
| 2003/0188320 A1 * | 10/2003 | Shing ............................ | 725/131 |
| 2003/0200439 A1 * | 10/2003 | Moskowitz .................... | 713/176 |
| 2004/0023655 A1 * | 2/2004 | Hoy et al. ...................... | 455/445 |
| 2004/0114589 A1 * | 6/2004 | Alfieri et al. .................. | 370/389 |
| 2004/0133499 A1 * | 7/2004 | Mitreuter et al. .............. | 705/37 |
| 2004/0227621 A1 * | 11/2004 | Cope et al. ............... | 340/310.01 |
| 2004/0230797 A1 * | 11/2004 | Ofek et al. .................... | 713/168 |
| 2005/0038875 A1 * | 2/2005 | Park .............................. | 709/219 |
| 2005/0089052 A1 * | 4/2005 | Chen et al. .................... | 370/401 |
| 2005/0163320 A1 * | 7/2005 | Brown et al. ................. | 380/270 |
| 2005/0198531 A1 * | 9/2005 | Kaniz et al. .................. | 713/201 |
| 2006/0005015 A1 * | 1/2006 | Durham et al. ............... | 713/164 |
| 2006/0167818 A1 * | 7/2006 | Wentker et al. ............... | 705/64 |
| 2007/0214270 A1 * | 9/2007 | Absillis ........................ | 709/227 |

OTHER PUBLICATIONS

SampathKumar et al., Technologies for Distribution of Interactive Multimedia to Residential Subscribers, Jul. 1994, Proceedings of the 1st International Workshop on Community Networking Integrated Multimedia Services to the Home, pp. 151-160.*

* cited by examiner

*Primary Examiner* — Taghi Arani
*Assistant Examiner* — Kenneth Chang
(74) *Attorney, Agent, or Firm* — Toler Law Group, PC

(57) ABSTRACT

A secure network is disclosed. The secure network includes a residential gateway to communicate with a remote network and a local network. At least one trusted local device is configured to send communications including data packets with authentication information to the residential gateway to request access to resources of the remote network. The residential gateway inhibits a request received from the local network to access resources on the remote network until the residential gateway uses authentication information to authenticate data packets associated with the request as originating from the at least one trusted local device.

11 Claims, 6 Drawing Sheets

SYSTEM AND METHOD FOR SECURING A NETWORK

FIELD OF THE DISCLOSURE

The present disclosure is generally related to computer networks and to securing computer networks.

BACKGROUND

Service providers, such as broadband providers, cable television providers, Internet protocol television providers or providers of other similar services may extend their trusted networks into customers' homes by providing secure, trusted network access customer premises equipment, such as residential gateways. Additionally, service providers may provide interface equipment that allows customers to access specific features or content of the service provider network. For example, an IPTV service provider may provide a set-top box device to allow the customer to access video content and/or other features of the IPTV network. The service provider network may be configured to limit access to certain features or content of the network to approved devices, such as by an interface device provided by the service provider. However, since a modern computer systems may be capable of mimicking, or "spoofing" an interface device provided by the service provider, the service provider network may be vulnerable to unauthorized access.

DETAILED DESCRIPTION OF THE DRAWINGS

The present disclosure is generally directed to methods and devices for securing a network and to the secure networks themselves. A particular embodiment that is disclosed includes a secure network including a residential gateway to communicate with a remote network and a local network. The secure network also includes at least one trusted local device configured to send communications including data packets with authentication information to the residential gateway to request access to resources of the remote network. The residential gateway may inhibit a request received from the local network to access resources on the remote network until the residential gateway uses the authentication information to authenticate the data packets as coming from the at least one trusted local device.

Another particular embodiment that is disclosed includes a method of securing a network. The method includes receiving at least one first request to access resources of a remote network from a local network device. The at least one first request includes a plurality of data packets. The method also includes authenticating each data packet of the at least one first request as originating from a trusted local network device. The method further includes sending at least one second request to the remote network, after authenticating each data packet of the at least one first request as originated from the trusted local network device.

Another particular embodiment that is disclosed includes a set-top box with a local network interface to communicate with a local network. The set-top box also has a display interface to generate a display on a display device coupled to the set-top box. The set-top box also has an authentication module. The authentication module has an encryption key. The authentication module generates an integrity check value of each data packet of a request to access video content on a remote network. The authentication module encrypts the integrity check value using the encryption key before sending each data packet of the request to a network device on the local network.

Another particular embodiment that is disclosed includes a residential gateway having a first network interface to communicate with a first network and a second network interface to communicate with a second network. The residential gateway also includes an authentication module. The authentication module inspects data packets received from the second network to determine whether the data packets originated from a trusted network device.

Figure 1:
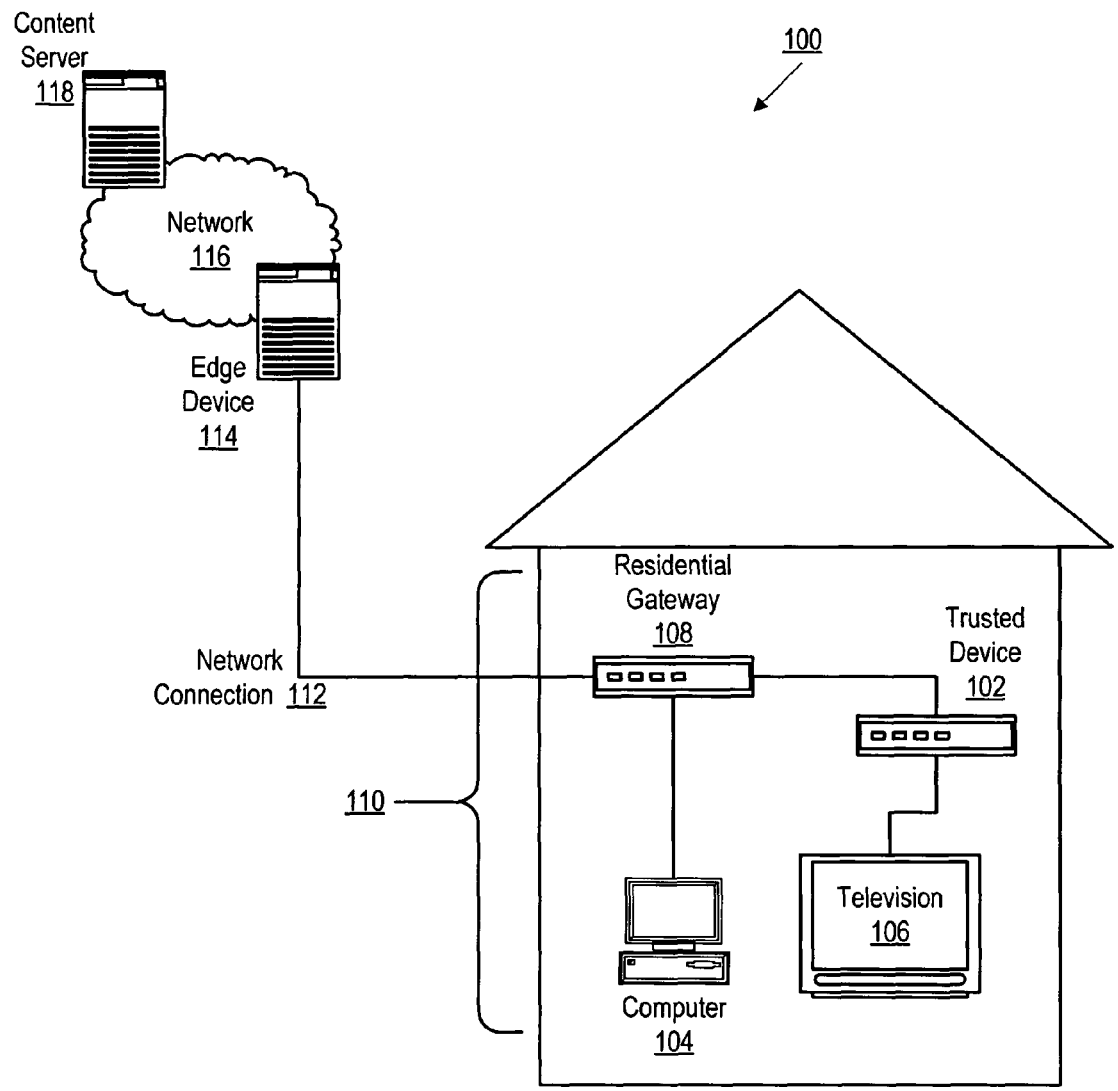
FIG. 1 is a diagram of an illustrative embodiment of a secure network.

FIG. 1 depicts a particular illustrative embodiment of a secure network 100. The secure network 100 includes remote network 116 and one or more trusted devices 102 coupled to the remote network 116 via a residential gateway 108. The remote network 116 may be under the control of a service provider. The service provider may, for example, provide access to content via a content server 118. In a particular illustrative embodiment, a trusted device 102 may be a device provided by the service provider, such as a set-top box. Thus, the trusted device 102 may be differentiated from other devices, such as computer 104, which may be in communication with the remote network 116 via the residential gateway 108, but are largely or completely outside the control of the service provider.

The remote network 116 may include an edge device 114. The edge device 114 generally refers to the device of the remote network 116 that communicates most directly with the residential gateway 108. For example, the edge device 114 may, in some configurations, be the only device of the remote network 116 that communicates directly with the residential gateway 108. An example of an edge device is a Digital Subscriber Line Access Multiplexer (DSLAM).

The trusted local device 102 is configured to communicate with the remote network 116 via the residential gateway 108. For example, the trusted local device 102 may be configured to send communications including data packets with authentication information to the residential gateway 108 to request access to resources of the remote network 116.

The residential gateway 108 communicates with the remote network 116 and a local network 110. The residential gateway 108 may inhibit some communications between the local network 110 and the remote network 116 if the residential gateway 108 cannot confirm that the communications came from the trusted local device 102. For example, the residential gateway 108 may inhibit a request to access resources on the remote network 116 that is received from the local network 110 until the residential gateway 108 uses authentication information in each data packet to authenticate each data packet of the request as originating from the trusted local device 102.

Figure 2:
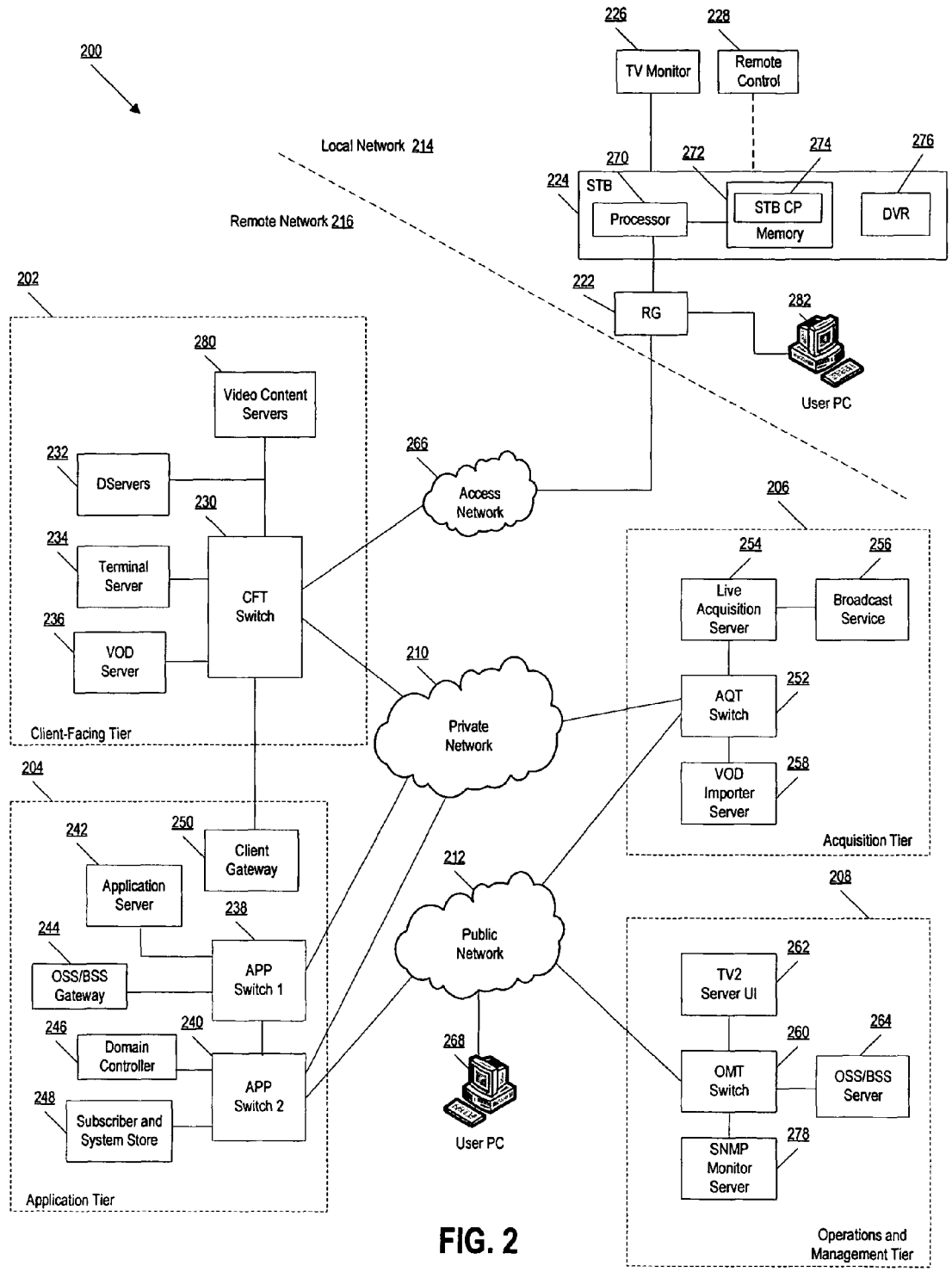
FIG. 2 is block diagram of an illustrative embodiment of a secure Internet Protocol Television network.

Referring to FIG. 2, an illustrative embodiment of a local network 214 in communication with a remote network 216 via a residential gateway 222 is shown. The particular illustrative embodiment depicted in FIG. 2 is an Internet Protocol Television (IPTV) system 200.

As shown, the system 200 may include a client facing tier 202, an application tier 204, an acquisition tier 206, and an operations and management tier 208. Each tier 202, 204, 206, 208 may be coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

As illustrated in FIG. 2, the client-facing tier 202 can communicate with user equipment via an access network 266, such as an Internet Protocol Television (IPTV) access network. In a particular illustrative embodiment, customer premises equipment, such as a residential gateway 222, can be coupled to the access network 266. In such an embodiment, the residential gateway 222 may reside on the local network 214 while the access network 266 is part of the remote network 216. The client-facing tier 202 can communicate with a representative set-top box device 224 via the residential gateway 222. The client-facing tier 202 can communicate with a large number of set-top box devices, such as the representative set-top box device 224, over a wide geographic area, such as a regional area, a metropolitan area, a viewing area, a designated market area or any other suitable geographic area, market area, or subscriber or customer group that can be supported by networking the client-facing tier 202 to numerous set-top box devices. In an illustrative embodiment, the client-facing tier 202, or any portion thereof, can be included at a video head-end office.

In a particular embodiment, the client-facing tier 202 can be coupled to the residential gateway 222 via fiber optic cables. Alternatively, the residential gateway 222 may include a digital subscriber line (DSL) modem that is coupled to one or more network nodes via twisted pairs, and the client-facing tier 202 can be coupled to the network nodes via fiber-optic cables. The set-top box device 224 can process data received via the access network 266, via an IPTV software platform, such as Microsoft® TV IPTV Edition.

The set-top box device 224 can be coupled to an external display device, such as a television monitor 226. The set-top box device 224 can communicate with a remote control 228 to receive input from a user. The set-top box device 224 may be an IPTV set-top box device; a video gaming devices or console adapted to receive IPTV content; a personal computer or other computing device adapted to emulate set-top box device functionality; any other device adapted to receive IPTV content and transmit data to an IPTV system via an access network; or any combination thereof.

In an exemplary, non-limiting embodiment, the set-top box device 224 can receive video content, which may include video and audio portions, from the client-facing tier 202 via the access network 266. The set-top box device 224 can transmit the video content to external display devices, such as the television monitor 226. Further, the set-top box device 224 can include a STB processor 270 and a memory device 272, which is accessible to the STB processor 270. In one embodiment, a computer program, such as the STB computer program 274, can be embedded within the memory device 272. The set-top box device 224 can also include an internal video content storage device, such as a digital video recorder (DVR) 276.

In an illustrative embodiment, the client-facing tier 202 can include a client-facing tier (CFT) switch 230 that manages communication between the client-facing tier 202 and the access network 266 and between the client-facing tier 202 and the private network 210. As shown, the CFT switch 230 is coupled to one or more data servers, such as D-servers 232, that store, format, encode, replicate, or otherwise manipulate or prepare video content for communication to the set-top box device 224. The CFT switch 230 can also be coupled to a terminal server 234 that provides terminal devices with a connection point to the private network 210. In a particular embodiment, the CFT switch 230 can also be coupled to a video-on-demand (VOD) server 236 that stores or provides VOD content imported by the IPTV system 200. In a particular embodiment, the CFT switch 230 can also be coupled to one or more video content servers 280. The video content server(s) 280 can include a cluster of video content servers, such as a group of multicast video content servers.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box device 224 via the access network 266, which enable the set-top box device 224 to provide functions, such as display, messaging, processing of IPTV data and VOD material, etc. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

Further, the second APP switch 240 can be coupled to a domain controller 246 that provides Internet access, for example, to users via the public network 212. For example, the domain controller 246 can provide remote Internet access to IPTV account information, e-mail, personalized Internet services, or other online services via the public network 212. Users can access such information or services using, for example, their personal computers 268. The second APP switch 240 can be coupled to a subscriber and system store 248 that includes account information, such as account information that is associated with users who access the system 200 via the private network 210 or the public network 212. Additionally, the second APP switch 240 can be coupled to one or more interactive voice response (IVR) servers (not shown) that can communicate with a user telephone (not shown) via the public network 212.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television or movie content, for example, from a broadcast service 256. In a particular embodiment, the live acquisition server 254 can transmit the television or movie content to the AQT switch 252, and the AQT switch 252 can transmit the television or movie content to the CFT switch 230 via the private network 210.

Further, the television or movie content can be transmitted to the D-servers 232, where it can be encoded, formatted, stored, replicated, or otherwise manipulated and prepared for communication to the set-top box device 224. The CFT switch 230 can receive the television or movie content from the D-servers 232 and communicate the content to the residential gateway 222 via the access network 266. The set-top box device 224 can receive the television or movie content via the residential gateway 222, and can transmit the television or movie content to the television monitor 226. In an illustrative embodiment, video or audio portions of the television or movie content can be streamed to the set-top box device 224.

Further, the AQT switch 252 can be coupled to a video-on-demand importer server 258 that stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box device 224, the requests can be transmitted over the access network 266 to the VOD server 236, via the CFT switch 230. Upon receiving such requests, the VOD server 236 can retrieve the requested VOD content and transmit the content to the set-top box device 224 across the access network 266, via the CFT switch 230. The set-top box device 224 can transmit the VOD content to the television monitor 226. In an illustrative embodiment, video or audio portions of VOD content can be streamed to the set-top box device 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 270 that monitors network devices within or coupled to the IPTV system 200. In a particular embodiment, the OMT switch 260 can communicate with the AQT switch 252 via the public network 212.

In an illustrative embodiment, the live acquisition server 254 can transmit the television or movie content to the AQT switch 252, and the AQT switch 252, in turn, can transmit the television or movie content to the OMT switch 260 via the public network 212. In this embodiment, the OMT switch 260 can transmit the television or movie content to the TV2 server 262 for display to users accessing the user interface at the TV2 server 262. For example, a user can access the TV2 server 262 using a personal computer (PC) 268 coupled to the public network 212.

In a particular embodiment, a user can issue a request to the set-top box device 224 to receive video content, for example, from the VOD server 236 or the video content servers 280. The set-top box device computer program 274 can include instructions executable by the processor 270 to transmit the request to the CFT switch 230 via the residential gateway 222. The set-top box device 224 can receive the video content via the residential gateway 222, for example, and transmit the video content to a television monitor 226 that is coupled to the set-top box device 224.

In a particular embodiment, the application tier 204 may include a client gateway 250 that communicates data directly with the client-facing tier 202. In this embodiment, the client gateway 250 can be coupled directly to the CFT switch 230. The client gateway 250 can provide or restrict access to the private network 210 and the tiers coupled thereto.

In a particular embodiment, the set-top box device 224 can access the IPTV system 200 via the access network 266, using information received from the client gateway 250. In this embodiment, the access network 266 can provide security for the remote network 210. User devices can access the client gateway 250 via the access network 266, and the client gateway 250 may allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the set-top box device 224 accesses the remote network 216 via the access network 266, the client gateway 250 can verify subscriber information by communicating with the subscriber and system store 248 via the private network 210, the first APP switch 238, and the second APP switch 240. Further, the client gateway 250 can verify billing information and status by communicating with the OSS/BSS gateway 244 via the private network 210 and the first APP switch 238. In an embodiment, the OSS/BSS gateway 244 can transmit a query via the first APP switch 238, to the second APP switch 240, and the second APP switch 240 can communicate the query via the public network 212 to the OSS/BSS server 264. After the client gateway 250 confirms subscriber and/or billing information, the client gateway 250 may allow the set-top box device 224 to access IPTV content and VOD content. If the client gateway 250 cannot verify subscriber information for the set-top box device 224, e.g., because it is connected to an unauthorized twisted pair, the client gateway 250 can block transmissions to and from the set-top box device 224 beyond the access network 266.

In some embodiments, an additional layer of security may be used to prevent unauthorized devices from accessing the remote network 216 via the access network 266. Local network 214 may include more than one device coupled to residential gateway 222 not all of which may be authorized to access certain portions of or content on the remote network 216. For example, one or more user personal computers 282 or other network devices may connect to the remote network 216 via the residential gateway 222 to gain access to the Internet. The personal computer 282 may connect to the residential gateway 222 directly, e.g. through a wired or wireless connection, as shown. Alternatively, the computer 282 may connect to the residential gateway through another network device, such as the set-top box device 224. In such arrangements, the remote network may be vulnerable to unauthorized access by the computer 282. For example, the computer 282 could be configured to simulate or "clone" the set-top box device 224 to convince the client gateway 250 to allow the computer 282 access to the remote network 216. To secure the remote network 216 against such unauthorized access, the residential gateway 222 may be configured to inhibit certain communications from the local network 214 unless the residential gateway 222 can authenticate the source of the communications.

For example, a request to access particular content on the remote network 216, such as video content, may be sent as data packets from the set-top box device 224 to CFT switch 230 via the residential gateway 222. The set-top box device 224 may include authentication information in each data packet. For example, the processor 270 may generate an integrity check value (ICV) for each data packet and encrypt the ICV using an encryption key to form an authentication header.

The residential gateway may inspect data packets received from the local network 214 to detect data packets that include a request to access video content on the remote network 216 or to detect data packets that include authentication information. The residential gateway 222 may inhibit a request from going to the remote network 216, e.g., the CFT switch 230, unless the residential gateway 222 can authenticate each data packet of the request as originating from a trusted local network device. A trusted local network device refers to a device authorized to access the requested content, such as set-top box device 224.

The residential gateway 222 may authenticate each data packet by verifying authentication information in the data packet. In a particular illustrative embodiment, the authentication information may include an authentication header, for example, an IPsec authentication header. Such an authentication header may include an ICV which may include a cryptographic hash value of the header or data packet, and a secret key. As used herein, an encryption key or decryption key may include a cryptographic key, used for example to generate a cryptographic hash value, and/or a secret key used to generate an ICV.

The residential gateway 222 may verify an authentication header by decrypting and verifying the ICV. The ICV may be decrypted using a decryption key corresponding to the encryption key expected to be available to a trusted local network device. For example, the decryption key may be given to the residential gateway 222 directly during a registration process or using Internet Key Exchange. In another example, the set-top box device may be assigned a private encryption key by the residential gateway 222 or IPTV system 200 during an initial setup or configuration step. The encryption key may correspond to a public encryption key available via the remote network 216 from the CFT switch 230 or another trusted remote source.

Figure 3:
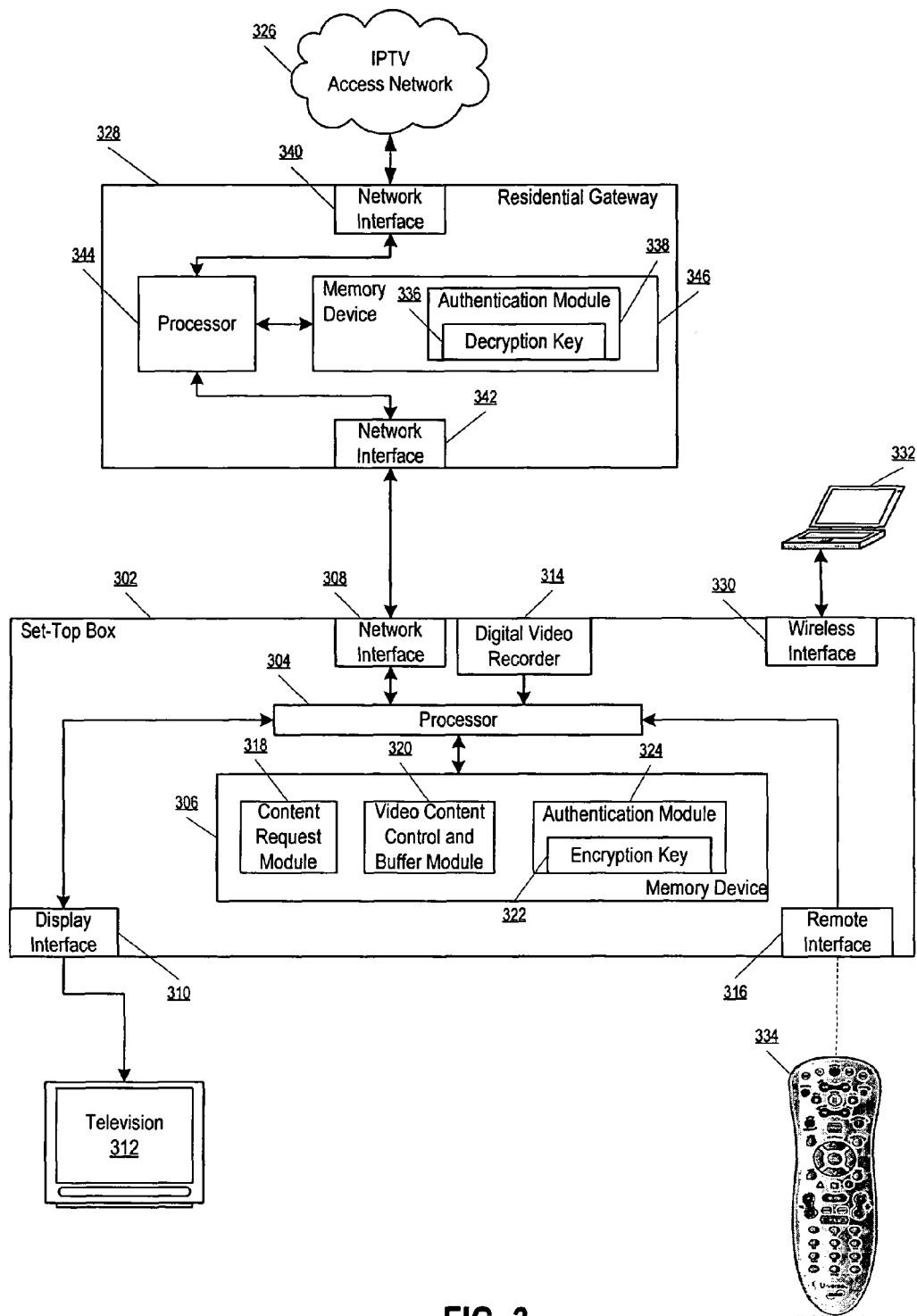
FIG. 3 is a block diagram of an illustrative embodiment of local devices of a secure network.

Referring to FIG. 3, an illustrative embodiment of local devices of a secure network are depicted. The local devices of the network include a set-top box device 302. The set-top box device 302 includes a processor 304 and a memory device 306 that is accessible to the processor 304. The processor 304 communicates with a network interface 308. Further, the processor 304 communicates with a display interface 310, such as a television interface, through which the set-top box device 302 can communicate video content, prompts, graphical user interfaces, or other content to an external display device, such as a television monitor 312. The processor 304 can communicate with an internal video storage device, such as a digital video recorder (DVR) 314. In addition, the processor 304 can communicate with a remote control device 334, via a remote control interface 316.

The processor 304 can communicate with a remote network, such as an Internet Protocol Television (IPTV) access network 326, via the network interface 308. In an illustrative, non-limiting embodiment, the IPTV access network 326 can be the access network 266 illustrated in FIG. 2. In a particular embodiment, network access customer premises equipment (CPE) can facilitate communication between the network interface 308 and the IPTV access network 326. The network access CPE can include a router, a local area network device, a modem, such as a digital subscriber line (DSL) modem, a residential gateway 328, or any other suitable device for facilitating communication between the network interface 308 of the set-top box device 302 and the remote network 326.

In an illustrative embodiment, the processor 304 can communicate with a wireless interface 330, such as an 802.11x interface. The processor 304 can receive and process data from, and communicate data to, a wireless computing device, such as a laptop computer 332, via the wireless interface 330. In an alternative embodiment, the set-top box device 302 can include an Ethernet connection that facilitates communication between the set-top box device 302 and the laptop computer 332. In still another alternative embodiment, the residential gateway 328 may include a wireless interface or wired interface to facilitate communications between the residential gateway 328 and the laptop computer 332.

In a particular embodiment, the memory device 306 can include a content request module 318. The content request module 318 can be executable by the processor 304 to receive a request for video content from a user via the remote control device 334. For example, the request can be a channel change request, a video-on-demand request, a request to access video content stored at the DVR 314, or any combination thereof. The content request module 318 can be executable by the processor 304 to send the request for the video content to a server of an IPTV system via the IPTV access network 326. In an illustrative, non-limiting embodiment, the request can be a join command to be added to a multicast group of a channel. In another illustrative, non-limiting embodiment, the request can include a command to download video content to the set-top box device 302.

In a particular embodiment, the memory device 306 can also include a video content control and buffer module 320 that is executable by the processor 304 to receive data packets carrying video content requested by a user and to buffer the video content before transmitting it to the display interface 310, in order to prevent underflow.

In a particular illustrative embodiment, the processor 304 may generate one or more data packets to communicate the request for video content to a remote network, such as the IPTV access network 326 via the network interface 308 and residential gateway 328. The authentication module 324 may be executable by the processor 304 to include authentication information with each data packet. For example, the authentication module 324 may be executable by the processor 304 to generate an ICV of each data packet of the request to access video content on the remote network. The authentication module 324 may include or have access to an encryption key 322. The authentication module 324 may encrypt the ICV using the encryption key 322 before sending each data packet of the request to a network device on the local network, such as residential gateway 328.

The residential gateway 328 may include a first network interface 340 to communicate with a first network, such as the IPTV access network 326. The residential gateway 328 may also include a second network interface 342 to communicate with a second network, such as the local network including the set-top box device 302. The residential gateway 328 may also include a processor 344 and a memory device 346. The memory device 346 may include an authentication module 338 executable by the processor 344 to verify authentication information in data packets of a request. The authentication module 338 may include at least one decryption key 336 corresponding to an encryption key 322 available to a trusted network device, such as set-top box device 302.

In operation, the residential gateway 328 may inspect data packets received from the local network. The residential gateway 328 may inspect all data packets received from the local network, only data packets that appear to be received from certain devices on the local network, or only certain types of data packets, e.g., requests to access video content on the remote network. In a particular illustrative embodiment, the authentication module 338 may inspect data packets received from the local network to determine whether the data packets came from a trusted network device. For example, the residential gateway 328 may decode an authentication header associated with each data packet and verify the decoded authentication header. Inspecting data packets received from the local network may also include verifying an ICV included in each data packet. If the authentication module 338 determines that the one or more data packets originated from a trusted network device, such as set-top box 302, the one or more data packets received from the local network may be forwarded to the remote network by the first network interface 340. If the authentication module 338 fails to determine that the one or more data packets originated from a trusted network device, the one or more data packets received from the local network may not be forwarded to the remote network.

The decryption key 336 of the residential gateway 328 may correspond to the encryption key 322 of the set-top box device 302. The encryption key 322 and the decryption key 336 may include a symmetric or asymmetric pair of cryptographic keys. Either the set-top box device 302 or the residential gateway 328 may have both keys 322, 336 in memory and share the appropriate key with the other device during a registration or setup process. In a particular illustrative embodiment, the set-top box device 302 may be configured to share a decryption key 336 corresponding to the encryption key 322 with the residential gateway 328. In another illustrative embodiment, the encryption key 322 includes a private key having a corresponding public key available to at least one network device of the local network, such as the residential gateway 328. For example, the residential gateway 328 may access the decryption key 336 from a trusted source on a remote network, such as a server on the IPTV network or another trusted third-party source in a public key infrastructure.

Figure 4:
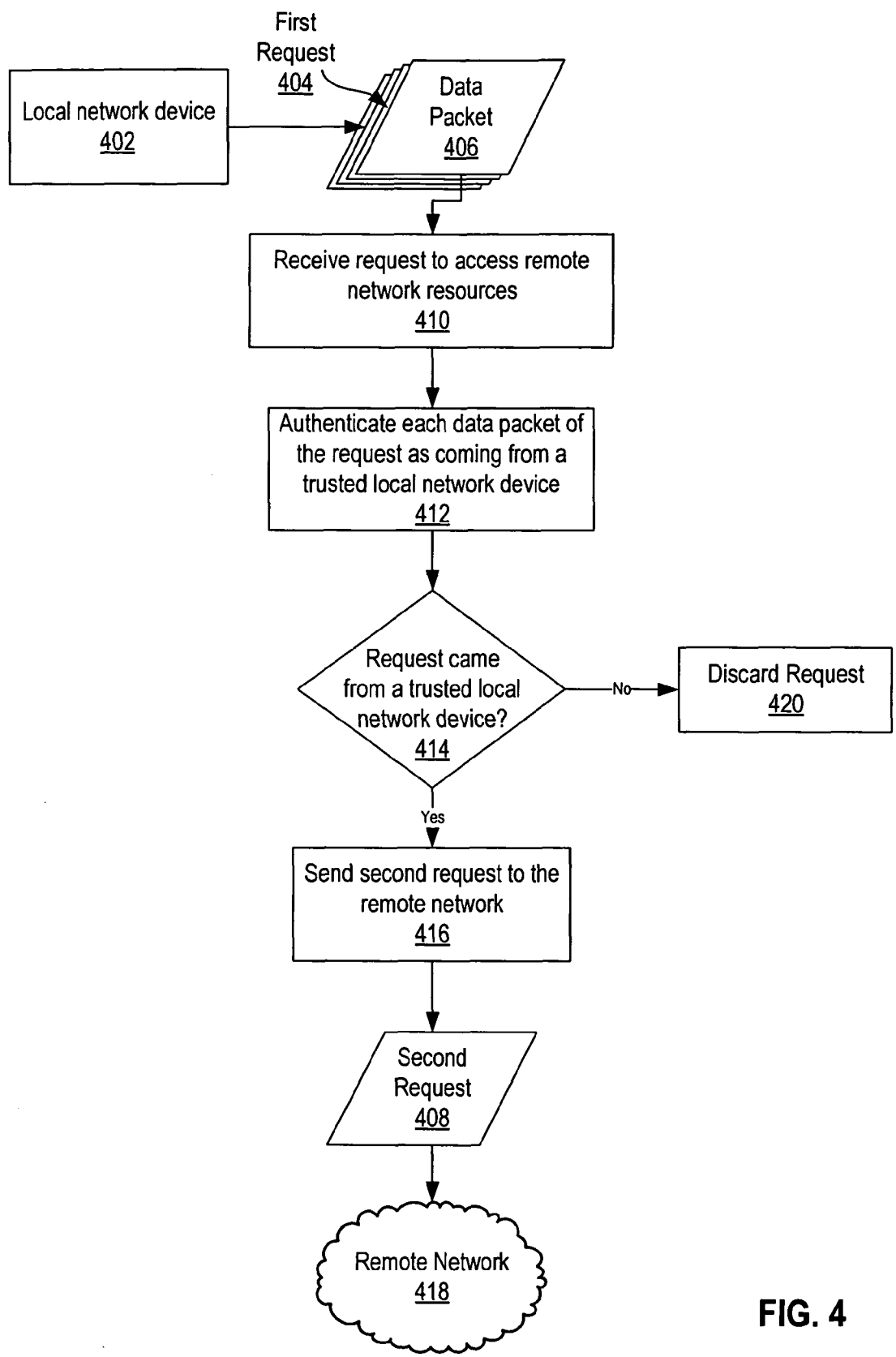
FIG. 4 is a flow chart of an illustrative embodiment of a method of securing a network.

FIG. 4 depicts a particular illustrative embodiment of a method of securing a network. The method includes receiving 410 a first request 404 to access resources of a remote network 418 from a local network device 402. The first request 404 may include a plurality of data packets 406.

The method also includes authenticating 412 each data packet associated with the first request 404 as originating from a trusted local network device, and determining, at 414, whether the first request 404 originated from the trusted local network device. If the first request 404 originated from the trusted local network device, the method includes sending 416 a second request 408 to the remote network 418. If the first request 404 did not originate from the trusted local network device, the method may include discarding 420 the request.

Figure 5:
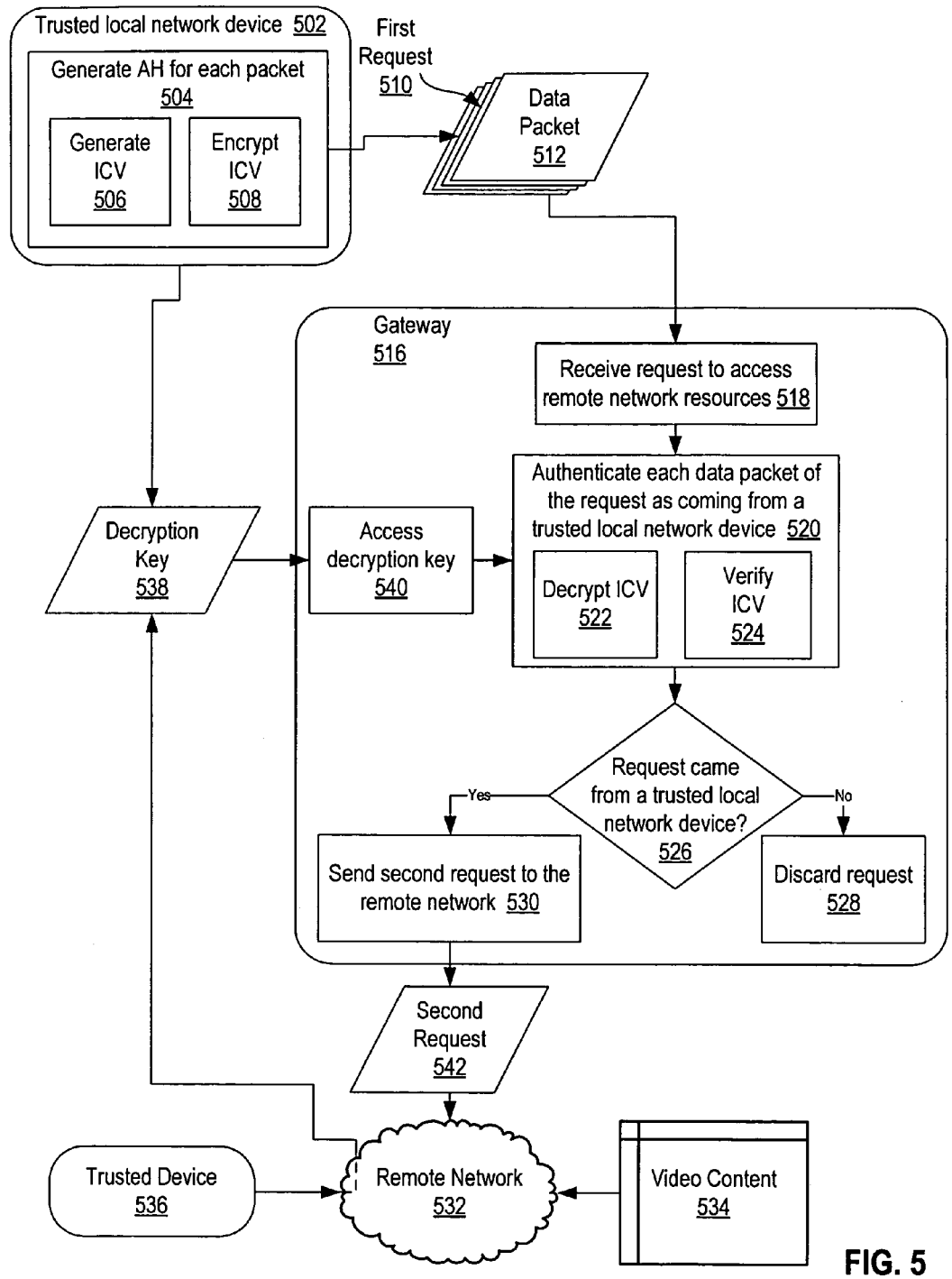
FIG. 5 is a flow chart of another illustrative embodiment of a method of securing a network.

FIG. 5 depicts another particular illustrative embodiment of a method of securing a network. The method includes a local network device, in this example, a trusted local network device 502, communicating a first request 510 to access resources, in this example, video content 534, on a remote network 532 to a residential gateway 516.

The trusted local network device 502 generates the first request 510 to access resources as a plurality of data packets 512. The method includes the trusted local network device 502 generating 504 an authentication header for each data packet 512 of the first request 510. Generating an authentication header 504 may include generating 506 an ICV for each data packet, and encrypting 508 the ICV. The encrypted ICV for a data packet may be included with the data packet as authentication information.

The method includes the residential gateway 516 receiving 518 the first request 510 to access resources of the remote network 532 from the trusted local network device 502. The method also includes authenticating 520 each data packet 512 of the first request 510 as originating from the trusted local network device 502. Authenticating each data packet 512 of the first request 510 may include, for example, decrypting an authentication header of each data packet and verifying the decrypted authentication header. If the authentication header includes an ICV, for example, authenticating each data packet 512 of the first request 510 may include decrypting 522 the ICV and verifying 524 the ICV.

To authenticate each data packet of the first request 510, the method may include accessing 540 a decryption key 538. Accessing 540 the decryption key 538 may include, for example, receiving the decryption key from the trusted local network device 502, or receiving the decryption key from a trusted source 536 on the remote network. The trusted source 536 may include, for example, a certification authority.

The method includes determining 526 whether the first request 510 originated from the trusted local network device 502. If the residential gateway 516 fails to authenticate each data packet of the first request 510 as originating from the trusted local network device 502, the method may include discarding 528 the first request 510. If the residential gateway 516 authenticates each data packet of the first request 510 as originating from the trusted local network device 502, the method may include sending 530 a second request 542 to the remote network 532. The second request 542 may correspond to the first request 510. That is, the second request 542 may request access to resources of the remote network 532, such as video content 534.

Figure 6:
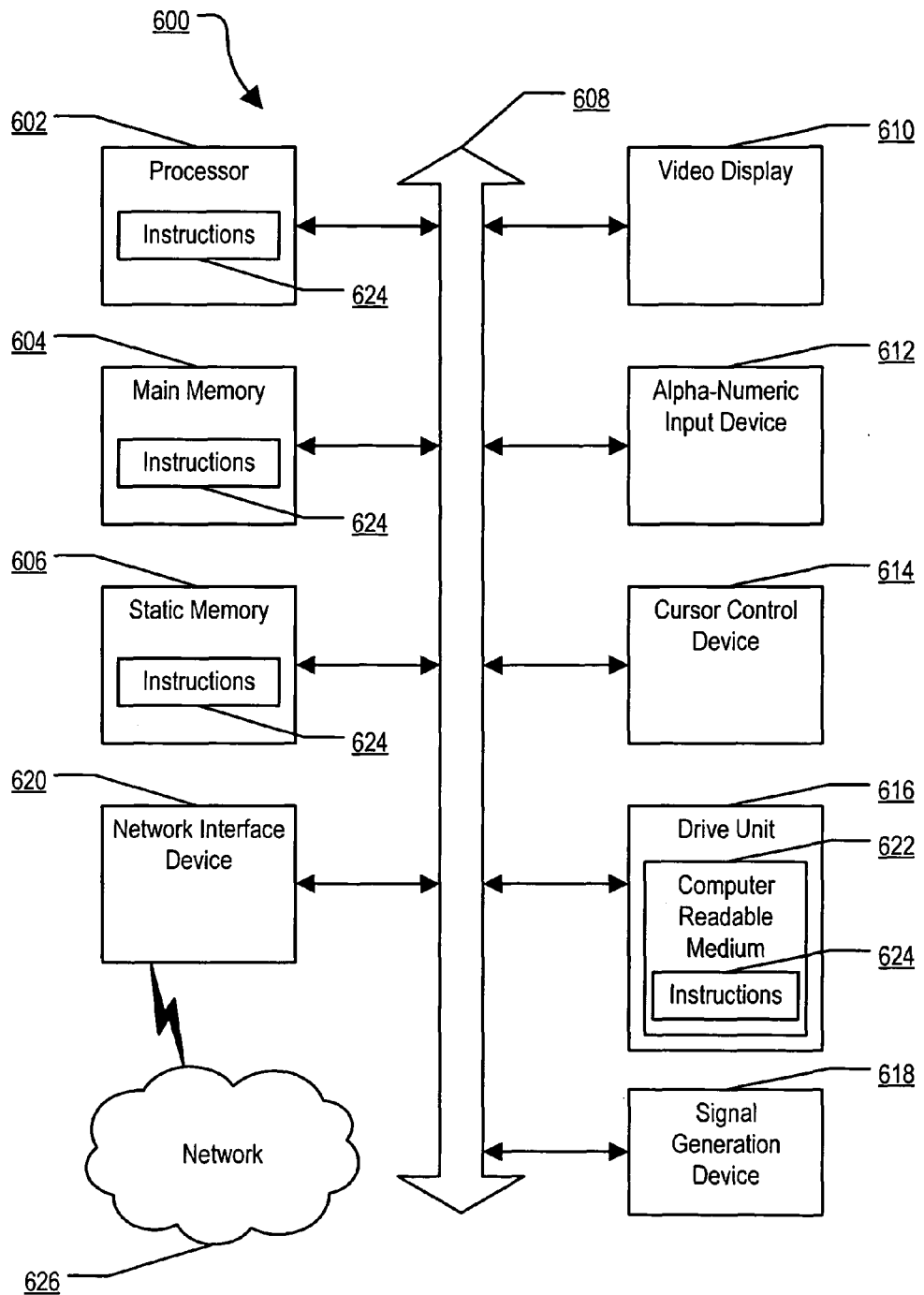
FIG. 6 is a block diagram of an embodiment of a general computer system.

Referring to FIG. 6, an illustrative embodiment of a general computer system is shown and is designated 600. The computer system 600 can include a set of instructions that can be executed to cause the computer system 600, or a portion thereof, to perform any one or more of the methods or computer based functions disclosed herein. The computer system 600, or any portion thereof, may operate as a standalone device or may be a hardware or software module within a server or other device, as illustrated in FIG. 2.

The computer system 600 can also be implemented as or incorporated into various other devices, such as the set-top box devices, residential gateways, or network access customer premise equipment (CPE), such as the devices illustrated in FIGS. 1-3, or any other machine capable of executing a set of instructions (sequential or otherwise) that specify actions to be taken by that machine. In a particular embodiment, the computer system 600 can be implemented using electronic devices that provide audio, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a residential gateway device to communicate with a remote internet protocol television network; and
    a gaming console device to:
    receive a private encryption key from the remote internet protocol television network before data packets are sent from the gaming console device to the residential gateway device, wherein the private encryption key is received in response to authorization by an administrator of the remote internet protocol television network; and
    send the data packets to the residential gateway device,
    wherein the data packets are sent to request access to video content from the remote internet protocol television network, wherein the request to access the video content includes a multicast group loin request for a channel, and wherein the data packets include authentication information comprising an IPSec authentication header that includes an integrity check value encrypted using the private encryption key;
    wherein the residential gateway device authenticates the data packets using a decryption key in response to receipt of the data packets, wherein the decryption key is received from the remote internet protocol television network, wherein the residential gateway device inhibits the request to access the video content until the residential gateway device authenticates the data packets to determine that the gaming console device is a trusted device and wherein the residential gateway device authenticates the data packets by verifying the integrity check value using the decryption key.

2. A residential gateway device comprising:
    a processor; and
    a memory accessible to the processor, the memory including instructions that, when executed by the processor, cause the processor to perform operations comprising:
    receiving, from a gaming console device, data packets indicating a request to access video content from a remote internet protocol television network, wherein the request includes a multicast group loin request for a channel, wherein the data packets include authentication information, the authentication information comprising an IPSec authentication header that includes an integrity check value encrypted using a private encryption key, and wherein the private encryption key is received by the gaming console device from the remote internet protocol television network in response to authorization by an administrator of the remote internet protocol television network and before the gaming console device sends the data packets;
    in response to receiving the request:
        receiving a decryption key from the remote internet protocol television network; and
        authenticating the data packets in the request using the decryption key, wherein authenticating the data packets includes verifying the integrity check value using the decryption key and wherein the request to access the video content is inhibited until the data packets are authenticated to determine that the data packets are received from a trusted device;
    in response to determining, based on authentication of the data packets, that the gaming console device is a particular trusted device, sending the data packets to the remote internet protocol television network; and
    in response to determining, based on the authentication of the data packets, that the gaming console device is not the particular trusted device, preventing the data packets from being sent to the remote internet protocol television network.

3. The residential gateway device of claim 2, wherein the operations further comprise inspecting predetermined types of the plurality of data packets.

4. A gaming console device comprising:
    a processor; and
    a memory accessible to the processor, the memory including instructions that, when executed by the processor, cause the processor to perform operations comprising:
    in response to authorization by an administrator of a remote internet protocol television network, receiving a private encryption key from the remote internet protocol television network before sending data packets to a residential gateway device, wherein the data packets are sent to request access to video content from the remote internet protocol television network and wherein the request to access the video content includes a multicast group loin request for a channel;
    generating an integrity check value for inclusion in an IPSec authentication header in authentication information included in the data packets sent to the residential gateway device wherein the integrity check value is encrypted using the private encryption key before the data packets are sent to the residential gateway device; and
    sending the data packets to the residential gateway device;
    wherein the residential gateway device authenticates the data packets using a decryption key in response to receipt of the data packets, wherein the decryption key is received from the remote internet protocol television network, wherein the residential gateway device inhibits the request to access the video content from the remote internet protocol television network until the residential gateway device authenticates the data packets to determine that the data packets are received from a trusted device, and wherein the residential gateway device authenticates the data packets by verifying the integrity check value of the data packets using the decryption key.

5. A method comprising:
    receiving, at a residential gateway device, from a gaming console device, data packets indicating a request to access video content from a remote internet protocol television network, wherein the data packets include authentication information comprising an IPSec authentication header that includes an integrity check value encrypted using a private encryption key, and wherein the private encryption key is received by the gaming console device from the remote internet protocol television network in response to authorization by an administrator of the remote internet protocol television network and before the gaming console device sends the data packets;

in response to receiving the request:

receiving, at the residential gateway device, a decryption key from the remote internet protocol television network; and authenticating, at the residential gateway device, the data packets in the request using the decryption key, wherein authenticating the data packets includes verifying the integrity check value using the decryption key and wherein residential gateway device inhibits the request to access the video content until the residential gateway device authenticates the data packets to determine that the data packets are received from a trusted device;

in response to determining, based on the authentication of the data packets, that the gaming console device is a particular trusted device, sending, from the residential gateway device, the data packets to the remote internet protocol television network; and in response to determining, based on the authentication of the data packets, that the gaming console device is not the particular trusted device, preventing, at the residential gateway device, the data packets from being sent to the remote internet protocol television network.

6. The method of claim 5, wherein the video content includes video on demand content from the remote internet protocol television network.

7. The method of claim 5, wherein the decryption key is received from a second trusted device associated with the remote internet protocol television network.

8. The method of claim 7, wherein the second trusted device is a client-facing tier switch.

9. The method of claim 5, wherein the decryption key is accessed via a certification authority.

10. The method of claim 5, wherein the private encryption key is received by the claming console device during an initial setup of the gaming console device.

11. A computer readable memory device storing instructions that, when executed by a processor, cause the processor to perform operations comprising:

receiving, at a residential gateway device, from a gaming console device data packets indicating a request to access video content from a remote internet protocol television network, wherein the request includes a multicast group loin request for a channel, wherein the data packets include authentication information comprising an IPSec authentication header that includes an integrity check value encrypted using a private encryption key, and wherein the private encryption key is received by the gaming console device from the remote internet protocol television network in response to authorization by an administrator of the remote internet protocol television network and before the gaming console device sends the data packets;

in response to receiving the request:

receiving, at the residential gateway device, a decryption key from the remote internet protocol television network; and authenticating, at the residential gateway device, the data packets using the decryption key, wherein authenticating the data packets includes verifying the integrity check value using the decryption key and wherein the residential gateway device inhibits the request to access the video content until the residential gateway device authenticates the data packets to determine that the data packets are received from a trusted device; and in response to determining, based on the authentication of the data packets, that the gaming console device is a particular trusted device, sending, from the residential gateway device, the data packets to the remote internet protocol television network; and in response to determining, based on the authentication of the data packets, that the gaming console device is not the particular trusted device, preventing, at the residential gateway device, the data packets from being sent to the remote internet protocol television network.

* * * * *

UNITED STATES PATENT AND TRADEMARK OFFICE
CERTIFICATE OF CORRECTION

PATENT NO.          : 8,555,057 B2                                      Page 1 of 1
APPLICATION NO.     : 11/490848
DATED               : October 8, 2013
INVENTOR(S)         : Michael Raftelis et al.

It is certified that error appears in the above-identified patent and that said Letters Patent is hereby corrected as shown below:

In the Claims

Column 13, Claim 1, Line 29, "includes a multicast group loin request for a channel, and" should read --includes a multicast group join request for a channel, and--.

Column 13, Claim 2, Line 53, "the request includes a multicast group loin request for" should read --the request includes a multicast group join request for--.

Column 14, Claim 4, Line 34, "includes a multicast group loin request for a channel" should read --includes a multicast group join request for a channel--.

Column 15, Claim 10, Line 38, "key is received by the claming console device during an initial" should read --key is received by the gaming console device during an initial--.

Column 16, Claim 11, Line 8, "ticast group loin request for a channel, wherein the data" should read --ticast group join request for a channel, wherein the data--.

Signed and Sealed this
Twenty-fifth Day of February, 2014

Michelle K. Lee
*Deputy Director of the United States Patent and Trademark Office*